(12) United States Patent
Greco

(10) Patent No.: US 6,435,485 B1
(45) Date of Patent: Aug. 20, 2002

(54) COMPOSITE BOW MONO-LEAF SPRING

(75) Inventor: Giovanni Greco, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/771,918

(22) Filed: Jan. 29, 2001

(51) Int. Cl.[7] .............................. B60G 11/02; F16F 1/18
(52) U.S. Cl. ..................... 267/36.1; 267/47; 267/260; 267/148; 267/158
(58) Field of Search ................................ 267/148, 149, 267/158, 160, 164, 165, 52, 260–271, 36.1, 42, 43, 44, 45, 47, 180, 40; 280/124.163

(56) References Cited

U.S. PATENT DOCUMENTS

| | | | |
|---|---|---|---|
| 662,876 A | * 11/1900 | Parfrey | |
| 1,859,105 A | * 5/1932 | Munro | |
| 3,685,812 A | * 8/1972 | Buchesky et al. | 267/47 |
| 3,814,410 A | * 6/1974 | Fukui et al. | 267/47 |
| 3,849,037 A | * 11/1974 | Downs | |
| 3,891,197 A | * 6/1975 | Poulus | 267/47 |
| 4,475,723 A | * 10/1984 | Meyer | 267/47 |
| 4,565,356 A | * 1/1986 | Nickel | 267/148 |
| 4,667,921 A | * 5/1987 | DeGoncourt | 267/158 |
| 4,793,601 A | * 12/1988 | Wild et al. | 267/47 |
| 4,894,108 A | * 1/1990 | Richard et al. | 267/148 |
| 4,969,633 A | * 11/1990 | Ryan | 267/47 |
| 5,803,444 A | * 9/1998 | Shibuya et al. | 267/180 |

* cited by examiner

Primary Examiner—Douglas C. Butler

(57) ABSTRACT

A fiberglass composite monoleaf bow spring for use in a vehicle chassis system capable of multi-linear response when compressed. The fiberglass composite monoleaf bow spring extends longitudinally below a vehicle frame and is secured at each end of the vehicle frame typically using a pair of pinned end attachments and is secured in the middle to an axle. The spring has a central upwardly curved region introduced between two downwardly curved regions that are introduced between two more upwardly curved regions. The spring can be made using either a pre-preg process or three-dimensional weaving process. By varying the curvature either the upwardly curved regions or downwardly curved regions, or by varying the length and width of the bow spring, the rate of displacement along each portion of the multi-linear deflection response curve may be controlled.

8 Claims, 2 Drawing Sheets

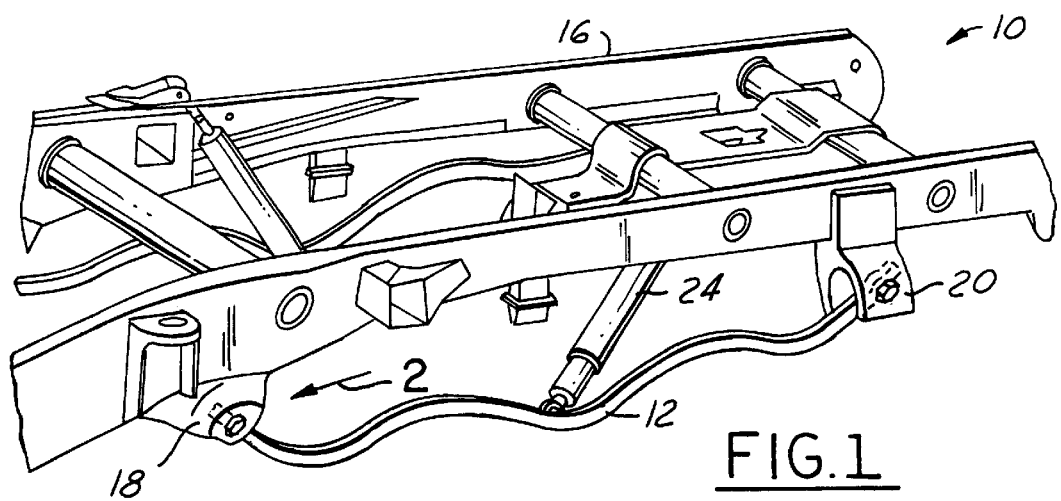
FIG. 1
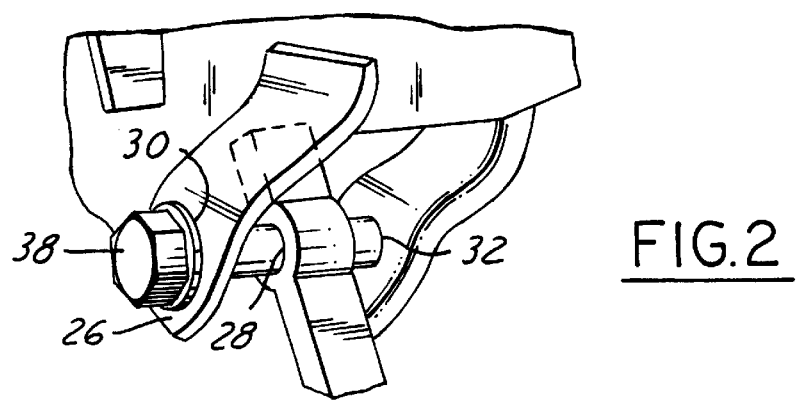
FIG. 2
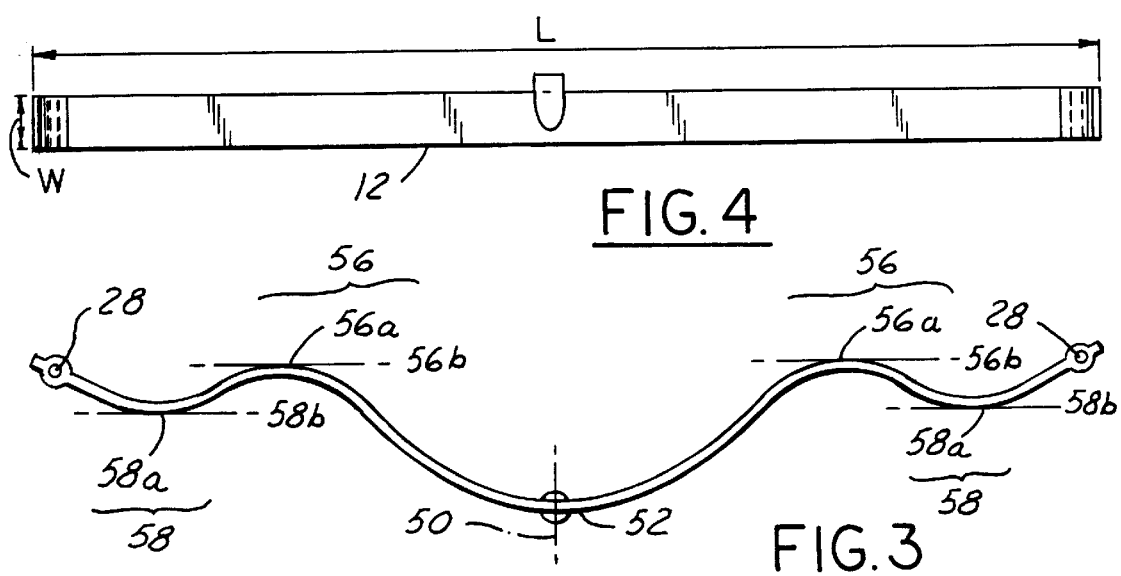
FIG. 4
FIG. 3

COMPOSITE BOW MONO-LEAF SPRING

TECHNICAL FIELD

The present invention relates generally to springs for chassis systems and more particularly to a composite bow mono-leaf spring for use in a chassis system.

BACKGROUND

A chassis system on an automobile works in cooperation with the tires, frame or unibody, wheels, wheel bearings, brake system, and steering system to provide a safe and comfortable means of transportation. A chassis system has several important functions, including supporting the various components of an automobile, allowing the tires to move up and down to provide a comfortable ride, allowing for rapid cornering without extreme body roll, keeping the tires on the road surfaces, preventing excessive body squat when accelerating, preventing excessive body dive when braking, allowing the front wheels to turn side-to-side for steering, and, in combination with the steering system, keeping the wheels in correct alignment.

Chassis system typically use springs, swivel joints, damping devices, moveable arms and other components to accomplish these functions. The springs that are used within chassis systems have two primary functions. First, the springs should jounce (compress) and rebound (extend) when the tires encounter objects and holes in the road surface. The springs should also support the weight of the car while still allowing suspension travel (movement).

Leaf springs are commonly made of flat plates or strips of spring steel bolted together. Recently, fiberglass has replaced steel in longitudinal leaf springs because it significantly reduces weight. Flat plates or strips allow for a sharper dual rate spring effect than currently available monoleaf springs. However, in currently available systems, a number of plates must be coupled together to get a desired bi-linear response.

It is thus highly desirable to design a monoleaf spring wherein the material systems used and geometry of the component will achieve multi-linear response.

SUMMARY OF THE INVENTION

It is thus an object of the present invention to create a monoleaf spring for use in a chassis system that achieves multi-linear response.

The monoleaf spring is designed having a central curved region introduced between two oppositely curved outer regions. The spring preferably is designed wherein each end of the spring has an open region for coupling with the chassis mount locations. Alternatively, each end region is coupled to the chassis mount locations with a separate end piece.

Other objects and advantages of the present invention will become apparent upon considering the following detailed description and appended claims, and upon reference to the accompanying drawings.

BRIEF DESCRIPTION OF THE DRAWINGS

FIG. 1 shows a rear chassis system having a composite bow mono-leaf spring according to one preferred embodiment of the present invention;

FIG. 2 shows a close-up of the attachment point of the composite bow mono-leaf spring to the vehicle frame of FIG. 1 rotated 90 degrees relative to FIG. 1;

FIG. 3 shows the composite bow mono-leaf spring of FIG. 1;

FIG. 4 is a top view of FIG. 3; and

DESCRIPTION OF THE PREFERRED EMBODIMENTS(S)

Figure 5:
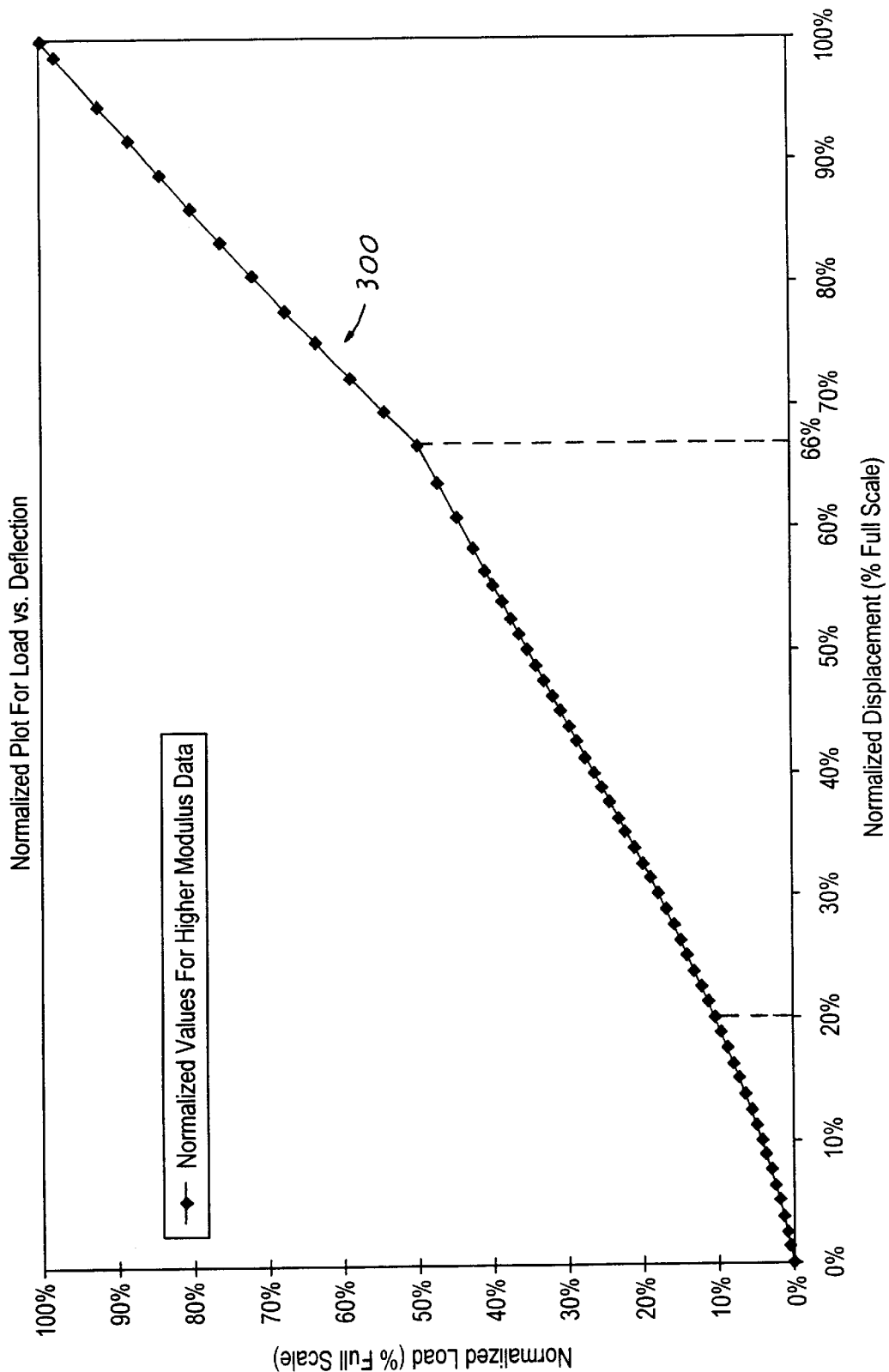
FIG. 5 illustrates a normalized force versus displacement curve for the composite bow-mono leaf spring of FIG. 1.

Referring now to FIG. 1, a chassis system 10 having a composite bow leaf spring 12 according to a preferred embodiment is depicted. The illustrated adaptation in FIG. 1 is for the rear of a vehicle. The spring 12 extends longitudinally below the vehicle frame 16 and has a pinned end attachment 18, 20 at each end of the spring for attachment to the vehicle frame 16. A close-up view of the end attachments is described below in FIG. 2. In addition, the spring 16 is center attached to the axle (not shown) in a manner that is similar to a conventional Hotchkiss suspension. A pair of shock absorbers 24 may also be connected to the vehicle frame 16 and the axle in a manner similar to a typical Hotchkiss suspension to dampen up and down motions.

Referring to FIG. 2, a close-up of one of the end attachment points of the spring 12 to the vehicle frame is depicted. The spring 12 has a pinned end attachment 26 co-molded into each end that can accept a bolt 38 that is inserted through the pinned end attachment 26 either before or after the spring 12 is molded. The vehicle frame has a pair of holes 30, 32 for accepting and securing the bolt 38. Depending upon the characteristics of the chassis system containing the spring 12, a shackle (not shown) may be needed to help secure the spring 12 to the vehicle frame 16.

As seen in FIGS. 3 and 4, the composite mono-leaf spring 12 generally has a wave-type design that is preferably symmetrical about a central, vertical axis 50. Extending from a middle upwardly curved region 52, or central concave region, towards the end regions 54 outwardly are a pair of downwardly curved regions 56, or outwardly convex regions, and second pair of upwardly curved regions 58, or outer concave regions. Depending upon the spring rate requirements, the amount of curve in the middle upwardly curved region 52, the downwardly curved regions 56, or the second pair of upwardly curved regions 58 may be increased or decreased. Preferably, the middle upwardly curved region 52 curves upward at an angle between ten and sixty degrees relative to a horizontal axis perpendicular to center vertical axis 50, with a larger angle relative to the horizontal axis corresponding to a spring 12 having higher load capacity characteristics. Further, the pair of downwardly curved regions 56 preferably curve at an angle downward between zero and forty-five degrees relative to a horizontal axis 56b passing through their respective pivot points 56a, and the second pair of upwardly curved regions 58 preferably curve upward at an angle upward between ten and eighty degrees relative to a horizontal axis 58b passing through their respective pivot points 58a.

The spring 12 has a pair of molded in pin end attachments 28 for securing the spring 12 to the vehicle frame. Of course, in alternative arrangements, the shape of the pin end attachments 28 may be modified in any number of arrangements depending upon how the spring 12 will ultimately be secured to the vehicle frame 16 and still come within the spirit and scope of the present invention.

As depicted in FIG. 4, the width w of the spring 12 is consistent throughout the length 1 of the spring 12. The width w is a function of the spring rate desired for the spring 12.

Fiberglass leaf springs are preferable to metal leaf springs for a number of reasons. First, fiberglass leaf springs 12 such as in FIG. 1 have a strength that is approximately five times greater than average cold rolled steel.

Second, this extra strength allows for a greater range of loads available for using the monoleaf fiberglass leaf springs 12 of the present invention. FIG. 5 illustrates a force versus displacement (deflection) curve for the composite spring 12 of FIG. 1.

Third, as FIG. 5 illustrates, the composite spring 12 of FIG. 1 achieves not just bi-linear response, but actually a multi-linear response. Referring now to FIG. 5, the displacement of the spring 12 along line 300 between approximately 0 and 10% of its normalized load corresponds to a first slope of approximately 10% normalized load per 20% normalized displacement, or 1/2. Between 20% and 66% normalized displacement, this slope decreases to a second slope of approximately 1/1. Between 66% and 100% normalized displacement, this slope decreases further to a third slope of approximately 1.5/1. Thus, the amount of reaction force necessary to displace the spring along its normalized load scale changes as the amount of force is increased. Here, three actual different levels of linear response are achievable along a normalized plot for load versus deflection of the composite spring as depicted in FIG. 1. By modifying the amount of curve in either middle upwardly curved region 52, downwardly curved regions 56, or upwardly curved regions 58, or any combination thereof, or by modifying the thickness or width of the composite material, the spring rate characteristics of the spring 12 along the first slope, second slope, or third slope may be increased or decreased as desired. Further, these changes may affect the location in the plot as depicted in FIG. 5 of the rate changes from the first slope to second slope or the second slope to third slope. Finally, these changes may also increase of decrease the number of possible linear responses from three as depicted in FIG. 5 to some other number.

Minor modifications to the amount of curve in the middle upwardly curved region 52, the downwardly curved regions 56, the second pair of upwardly curved regions 58, the thickness of the composite, and/or the width of the composite spring allow the spring to be used under a wide variety of load demands, ranging from small pick up trucks having a load capacity of about 1000 pounds and a displacement of approximately 200 mm to a heavy duty truck having a load capacity of 2500 pounds and a deflection of approximately 350 mm. Of course that the load requirements may exceed that of a heavy-duty truck, and the composite spring 12 of the present invention can be designed to accommodate this additional stress. The composite spring 12 as depicted in FIG. 1 is thus ideal for use in a light truck chassis system.

To produce the composite spring 12, two preferred methods are currently contemplated. One method is to make the springs 12 out of layers of pre-preg tape. The pre-preg tape consists of unidirectional glass fibers with uncured resin surrounding them. The layers can be stacked on top of each other until a desired thickness is achieved. The layers are then compacted and heated, typically between 80 and 170 degrees Celsius, for a predetermined amount of time, to cure the resin. The amount of time necessary to cure the resin is a function of the curing temperature. As the temperature is increased, the amount of time necessary decreases. In a preferred embodiment, an epoxy resin is used to cure the layers and E-type fiberglass comprises the unidirectional glass fibers.

Another preferred method for making the springs 12 is 3-dimensional (3D) weaving. In this method, multiple spools of glass fiber feed fiber into a weaving machine that loops the glass fiber across the width and through the thickness, with a majority of the fibers running in the machine direction along the length of the beam preform. These preforms are then placed in a mold and injected with resin using an RTM process. This method allows the springs 12 to have integral pivots, as slits can be left in the preform allowing bushings or other inserts to be inserted in them. Again, as above, an epoxy resin is contemplated as the curing resin.

While the invention has been described in terms of preferred embodiments, it will be understood, of course, that the invention is not limited thereto since modifications may be made by those skilled in the art, particularly in light of the foregoing teachings. For example, while the spring 12 preferably has a symmetrical design, it is contemplated that the spring 12 may be asymmetrical depending upon the requirements of the chassis system. Further, the number of downwardly curved regions 56 and upwardly curved regions 58 extending in each direction from the middle upwardly curved region 52 may be increased from one on each side of the middle upwardly curved region 52 and still be within the spirit of the present invention.

What is claimed is:

1. A monoleaf bow spring comprising:

a central concave region;

a pair of convex regions, one of said pair of convex regions located adjacent to one side of said central concave region and the other of said pair of convex regions located adjacent to the other side of said central concave region; wherein one of said pair of convex regions curves downward at a second angle relative to a second horizontal axis, said second angle being between zero and forty-five degrees relative to said second horizontal axis and wherein the other of said pair of convex regions curves downward at a third angle relative to a third horizontal axis, said third angle being between zero and forty-five degrees relative to said third horizontal axis;

a pair of outer concave regions, each of said concave regions having an attachment region, wherein one of said pair of outer concave regions is located adjacent to said one of said pair of convex regions and the other of said pair of outer concave regions is located adjacent to said other of said pair of convex regions; wherein one of said pair of outer concave regions curves upward at a fourth angle relative to a fourth horizontal axis, said fourth angle being between ten and eighty degrees relative to said fourth horizontal axis and wherein the other of said pair of outer concave regions curves upward at a fifth angle relative to a fifth horizontal axis, said fifth angle being between ten and eighty degrees relative to said fifth horizontal axis.

2. The monoleaf bow spring of claim 1, wherein the monoleaf bow spring is symmetrical about a vertical axis running through the middle of said central concave region.

3. The monoleaf bow spring of claim 1, wherein said central concave region curves upward at a first angle relative to a horizontal axis.

4. The monoleaf bow spring of claim 3, wherein said first angle is between approximately ten degrees and sixty degrees relative to said horizontal axis.

5. The monoleaf bow spring of claim 1, wherein the monoleaf bow spring is comprised of a fiberglass composite material.

6. The monoleaf bow spring of claim 1, wherein said outer concave regions each have an integral pinned end attachment for securing the monoleaf spring to a vehicle frame of a vehicle chassis system.

7. The monoleaf bow spring of claim 6, wherein each of said integral pinned end attachments comprises a molded-in pinned end attachment.

8. The monoleaf bow spring of claim 1, wherein said monoleaf spring achieves a multi-linear deflection response when compressed under a load demand.

* * * * *